US007929518B2

(12) United States Patent
Shore et al.

(10) Patent No.: US 7,929,518 B2
(45) Date of Patent: Apr. 19, 2011

(54) METHOD AND SYSTEM FOR A GIGABIT ETHERNET IP TELEPHONE CHIP WITH INTEGRATED DDR INTERFACE

(75) Inventors: Paul Shore, Whistler (CA); Balwinder Boora, Surrey (CA); Henry Li, Vancouver (CA); Stephen Mueller, Foothill Ranch, CA (US)

(73) Assignee: Broadcom Corporation

( * ) Notice: Subject to any disclaimer, the term of this patent is extended or adjusted under 35 U.S.C. 154(b) by 1226 days.

(21) Appl. No.: 11/151,139

(22) Filed: Jun. 13, 2005

(65) Prior Publication Data

US 2006/0023698 A1 Feb. 2, 2006

Related U.S. Application Data

(60) Provisional application No. 60/588,783, filed on Jul. 15, 2004.

(51) Int. Cl.
*H04L 12/66* (2006.01)
*G06F 3/00* (2006.01)
(52) U.S. Cl. .......................................... 370/352; 710/52
(58) Field of Classification Search .................. None
See application file for complete search history.

(56) References Cited

U.S. PATENT DOCUMENTS

| 6,985,431 | B1 * | 1/2006 | Bass et al. ............................. 1/1 |
| 7,039,712 | B2 * | 5/2006 | Valavi et al. .................. 709/228 |
| 7,075,919 | B1 * | 7/2006 | Wendt et al. ................... 370/352 |
| 7,127,534 | B2 * | 10/2006 | Jackson et al. ................... 710/52 |
| 7,412,588 | B2 * | 8/2008 | Georgiou et al. ............... 712/33 |
| 2003/0236901 | A1 * | 12/2003 | Barazesh et al. .............. 709/230 |
| 2004/0008714 | A1 * | 1/2004 | Jones ........................... 370/428 |
| 2004/0015613 | A1 * | 1/2004 | Ikeda .............................. 710/1 |
| 2004/0153582 | A1 * | 8/2004 | Oyama et al. .................. 710/15 |
| 2005/0213571 | A1 * | 9/2005 | Barrack et al. ................ 370/389 |
| 2006/0129848 | A1 * | 6/2006 | Paksoy et al. ................. 713/193 |

* cited by examiner

*Primary Examiner* — Hong Cho
*Assistant Examiner* — Eunsook Choi
(74) *Attorney, Agent, or Firm* — McAndrew, Held & Malloy, Ltd.

(57) ABSTRACT

Methods and systems for processing data are disclosed herein and may comprise processing data via a single gigabit Ethernet IP telephone chip integrated within a gigabit Ethernet IP telephone. At least a portion of the processed data may be communicated to an off-chip DDR memory within the gigabit IP telephone via an on-chip DDR memory interface integrated within the gigabit IP telephone chip. The data may be acquired from the off-chip DDR memory via the DDR memory interface for the processing. A request to process the data may be received by the gigabit Ethernet IP telephone chip. The request for processing the data may comprise a Memory Read command, a Memory Write command, a Memory Write with Reply command, a Memory Swap command, an Input/Output (I/O) Read command, an I/O Write command, and/or an I/O Write with Reply command.

24 Claims, 6 Drawing Sheets

METHOD AND SYSTEM FOR A GIGABIT ETHERNET IP TELEPHONE CHIP WITH INTEGRATED DDR INTERFACE

CROSS-REFERENCE TO RELATED APPLICATIONS/INCORPORATION BY REFERENCE

This application makes reference to, claims priority to, and claims the benefit of U.S. Provisional Application Ser. No. 60/588,783 filed Jul. 15, 2004 and entitled "Method and System for a Gigabit Ethernet IP Telephone Chip."

This application makes reference to:
U.S. application Ser. No. 11/151,138 filed Jun. 13, 2005;
U.S. application Ser. No. 11/151,388 filed Jun. 13, 2005;
U.S. application Ser. No. 11/151,614 filed Jun. 13, 2005; and
U.S. application Ser. No. 11/151,135 filed Jun. 13, 2005.

The above stated applications are hereby incorporated herein by reference in their entirety.

FIELD OF THE INVENTION

Certain embodiments of the invention relate generally to IP telephones. More specifically, certain embodiments of the invention relate to a method and system for a gigabit Ethernet IP telephone chip with integrated DDR interface.

BACKGROUND OF THE INVENTION

High-speed digital communication networks over copper and optical fiber are used in many network communication and digital storage applications. Ethernet and Fiber Channel are two widely used communication protocols, which continue to evolve in response to increasing demands for higher bandwidth in digital communication systems.

The Ethernet protocol may provide collision detection and carrier sensing in the physical layer. The physical layer, layer 1, is responsible for handling all electrical, optical, optoelectrical and mechanical requirements for interfacing to the communication media. Notably, the physical layer may facilitate the transfer of electrical signals representing an information bitstream. The physical layer (PHY) may also provide services such as, encoding, decoding, synchronization, clock data recovery, and transmission and reception of bit streams.

As the demand for higher data rates and bandwidth continues to increase, equipment vendors are continuously being forced to employ new design techniques for manufacturing network equipment capable of handling these increased data rates. In response to this demand, the physical layer, or PHY, has been designed to operate at gigabit speeds to keep pace with this demand for higher data rates. These gigabit PHYs are now becoming quite popular in home and office use.

Gigabit Ethernet, which initially found application in gigabit servers, is becoming widespread in personal computers, laptops, and switches, thereby providing the necessary infrastructure for handling data traffic of PCs and packetized telephones. However, network switches, which may be located in a central location within an office, run multiple cable mediums for network and voice data from the switch location to individual office locations, for example. In this regard, multiple cable mediums are now utilized to carry voice and network data. In the alternative, a single cable medium for voice and network data may run from the network switch to individual office locations. However, this scenario is costly as each office location will require a separate switch to route voice data to a telephone and network data to a PC.

Furthermore, existing 10/100Base Ethernet IP telephones place a bottleneck on the gigabit path between gigabit Ethernet enabled PCs and gigabit Ethernet wiring switches, since the Ethernet IP telephone is not adapted to process data utilizing gigabit speeds. Data may be communicated in gigabit speeds from a gigabit Ethernet switch to the Ethernet IP telephone, but the Ethernet IP telephone may only handle data at speeds lower than one gigabit. In this regard, existing telephones may only process gigabit Ethernet data speeds with an external gigabit Ethernet transceiver which increases connection complexity.

At gigabit speeds, storing information and retrieving stored information is central to the operation of a gigabit Ethernet IP telephone chip. This is particularly true for sensitive traffic such as voice data. The type of memory that is utilized to store the information and the configuration of the memory may also affect operation of the gigabit Ethernet IP telephone.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a gigabit Ethernet IP telephone chip with integrated DDR interface, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a gigabit Ethernet IP telephone chip with integrated double data rate (DDR) interface. The gigabit Ethernet IP telephone chip in accordance with an embodiment of the invention eliminates the bottleneck placed by existing 10/100 Ethernet IP telephones on the gigabit path between PCs and wiring closet switches by integrating a multiport 10/100/1000 Ethernet switch in a single gigabit Ethernet IP telephone chip. The gigabit Ethernet IP telephone chip may also utilize a DDR interface to communicate with an off-chip memory, such as a DDR synchronous dynamic random access memory (SDRAM), resulting in increased processing speed and efficiency of the gigabit Ethernet IP telephone chip. In this regard, the DDR interface may function as a primary memory interface for the gigabit Ethernet IP telephone chip for handling buffering packetized data during processing, such as encoding and/or decoding of voice data. The DDR interface integrated within the gigabit Ethernet IP telephone chip may also facilitate the buffering of core processor instructions and/or digital signal processing instructions during the processing of data.

Figure 1A:
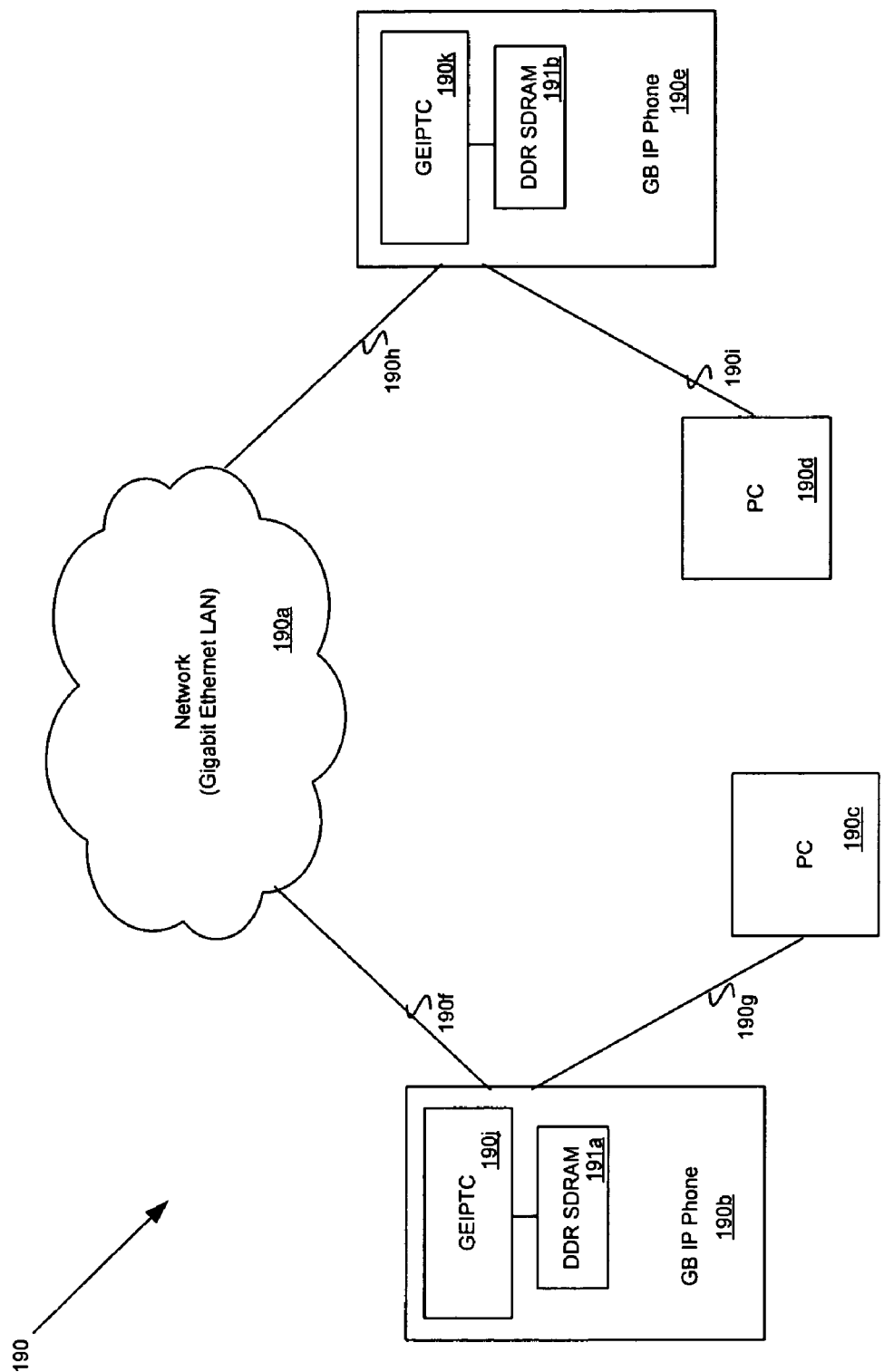
FIG. 1A is an exemplary system comprising gigabit IP telephones with an integrated DDR interface coupled to a network, in accordance with an embodiment of the invention.

FIG. 1A is an exemplary system comprising gigabit IP telephones with an integrated DDR interface coupled to a network, in accordance with an embodiment of the invention. Referring to FIG. 1A, the network telephone system 190 may comprise gigabit IP telephones 190b and 190e, personal computers (PCs) 190c and 190d, and an network 190a. The PCs 190c and 190d may be gigabit Ethernet enabled PCs. The network may comprise gigabit Ethernet local area network (LAN). The gigabit IP telephones 190b and 190e may each comprise an integrated gigabit Ethernet IP telephone chip (GEIPTC) 190j and 190k, respectively. The GEIPTC 190j and 190k may comprise suitable circuitry, logic, and/or code and may be adapted to support connection between the gigabit IP telephones 190b and 190e, the network 190a, and the PCs 190c and 190d, respectively. Furthermore, the GEIPTC 190j and 190k may comprise integrated DDR interfaces for using external memories 191a and 191b, respectively. In this regard, a single gigabit Ethernet cable medium 190f may connect the network 190a and the gigabit IP telephone 190b and a single gigabit Ethernet medium cable 190g may connect the gigabit IP telephone 190b with the gigabit enabled PC 190c. Similarly, a single gigabit Ethernet cable medium 190h may connect the network 190a and the gigabit IP telephone 190e and a single gigabit Ethernet medium cable 190i may connect the gigabit IP telephone 190e with the gigabit enabled PC 190d.

In operation, voice data may be communicated between gigabit IP telephones 190e and 190b, via Ethernet cable mediums 190h, 190f, and the network 190a. The network 190a may also communicate network data to the gigabit Ethernet enabled PCs 190c and 190d, via Ethernet cable mediums 190f, 190g, 190h, and 190i. In this regard, Ethernet cable mediums 190f and 190h may communicate network data, originating from the network 190a, and voice data, originating from either telephone 190b or telephone 190e. After gigabit IP telephones 190b and 190e receive voice and network data via Ethernet cable mediums 190f and 190h, the GEIPTC 190j and 190k integrated within gigabit IP telephones 190b and 190h may switch the voice data for processing within the telephones 190b and 190h. During transmission and reception by the telephones 190b and 190e, the voice data may be encoded or decoded. In this regard, the GEIPTC 190j and 190k may utilize the external DDR memory 191a and 191b to store encoded and/or decoded data, or core processor instructions, for example. Furthermore, the GEIPTC 190j and 190k may switch the network data to the PCs 190c and 190d via Ethernet cable mediums 190g and 190i, respectively.

Figure 1B:
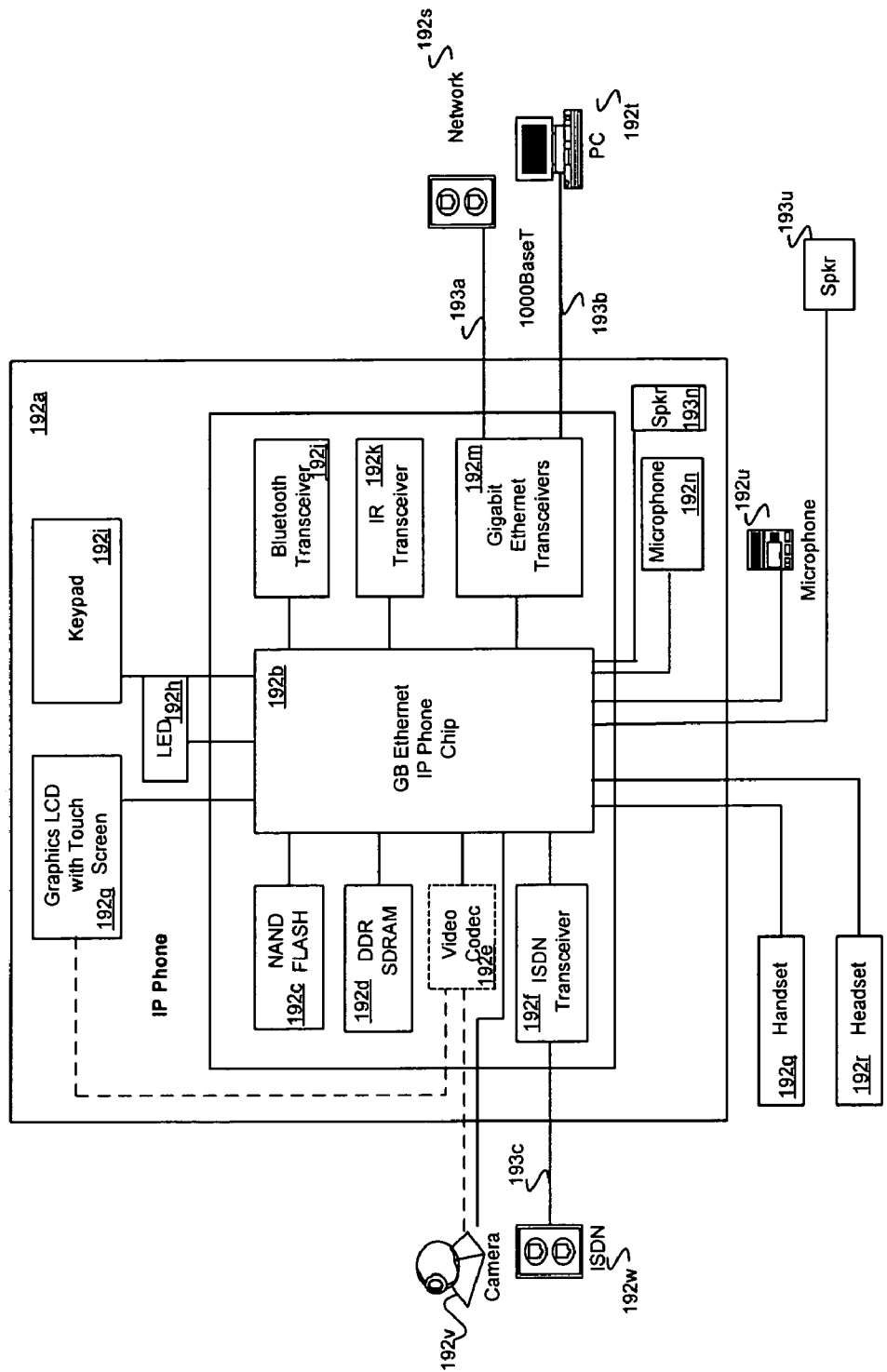
FIG. 1B is a block diagram of an exemplary gigabit Ethernet IP telephone comprising a single integrated gigabit Ethernet IP telephone chip with integrated DDR interface, in accordance with an embodiment of the invention.

FIG. 1B is a block diagram of an exemplary gigabit Ethernet IP telephone comprising a single integrated gigabit Ethernet IP telephone chip with integrated DDR interface, in accordance with an embodiment of the invention. Referring to FIG. 1B, the exemplary gigabit Ethernet IP telephone 192a may comprise a gigabit Ethernet IP telephone chip 192b, a LED 192h, keypad 192i, graphics LCD with touch screen capabilities 192g, NAND Flash memory 192c, double data rate synchronous dynamic random access memory (DDR SDRAM) 192d, an integrated services digital network (ISDN) transceiver 192f, internal microphone 192n, internal speaker 193n, a gigabit Ethernet transceiver (PHY) 192m, an IR transceiver 192k, and a Bluetooth® transceiver 192j. In one embodiment of the invention, the gigabit Ethernet IP telephone 192a may comprise a video codec block 192e, which may be optional.

In another embodiment of the invention, the gigabit Ethernet IP telephone chip 192b may be adapted to acquire and process voice data from one or more off-chip devices coupled to the gigabit Ethernet IP telephone 192a. For example, voice data may be communicated to the gigabit Ethernet IP telephone 192a from a network, such as a gigabit Ethernet LAN 192s via the Ethernet cable medium 193a and off-chip gigabit Ethernet transceiver (PHY) 192m, or from an ISDN 192w via cable medium 193c and an ISDN transceiver 192f. Voice data may be also communicated to the gigabit Ethernet IP telephone 192a via handset 192g, headset 192r, external speaker 193u, or internal speaker 193n.

In another embodiment of the invention, the gigabit Ethernet IP telephone chip 192b may be adapted to acquire and process network data from one or more off-chip devices coupled to the gigabit Ethernet IP telephone 192a. For example, network data may be received by the gigabit Ethernet IP telephone chip 192b from the network 192s via the Ethernet cable medium 193a and the gigabit PHY 192m. The gigabit Ethernet IP telephone chip 192b may utilize video codec 192e to decode received video data. Furthermore, video data may be communicated to the gigabit Ethernet IP telephone chip 102b for processing from an external camera 192v coupled to the video codec 192e. Processed data, which may comprise voice and/or video data, may be stored by the gigabit Ethernet IP telephone chip 192b in off-chip memory, such as NAND flash memory 192c and/or DDR SDRAM 192d via an integrated DDR interface. Video data may be also displayed by the LCD screen 192g. In one embodiment of the invention, the video codec 192e may be utilized for encoding as well as for providing video conferencing capabilities to the gigabit Ethernet IP telephone 192a. If the gigabit Ethernet IP telephone 192a comprises a video codec 192e, the camera 192v and the LCD 192g may be coupled to the video codec 192e. If the gigabit Ethernet IP telephone 192a does not comprise a video codec 192e, the camera 192v and the LCD 192g may be coupled to the gigabit Ethernet IP telephone chip 192b.

The gigabit Ethernet IP telephone chip 192b may comprise suitable circuitry, logic, and/or code and may be adapted to prioritize and switch voice and/or network data for processing within the gigabit Ethernet IP telephone 192a or outside the telephone 192a. For example, voice data may be communicated to the gigabit Ethernet IP telephone chip 192b from the ISDN 192w via the cable medium 193c and the off-chip ISDN transceiver 192f. Network data may be communicated to the gigabit Ethernet IP telephone chip 192b from the network 192s via the Ethernet cable medium 193b and the off-chip gigabit PHY 192m. The gigabit Ethernet IP telephone chip 192b integrated within the gigabit IP telephone 192a may then switch the voice data for processing within the telephone 192a. The network data may be switched to the PC 192t via the off-chip gigabit Ethernet PHY 192m and the Ethernet cable medium 193b. Other data switching scenarios for switching voice and/or network data by the gigabit Ethernet IP telephone chip 192b may also be possible utilizing one or more peripheral device coupled to the gigabit IP telephone 192a, as illustrated in FIG. 1B.

Figure 1C:
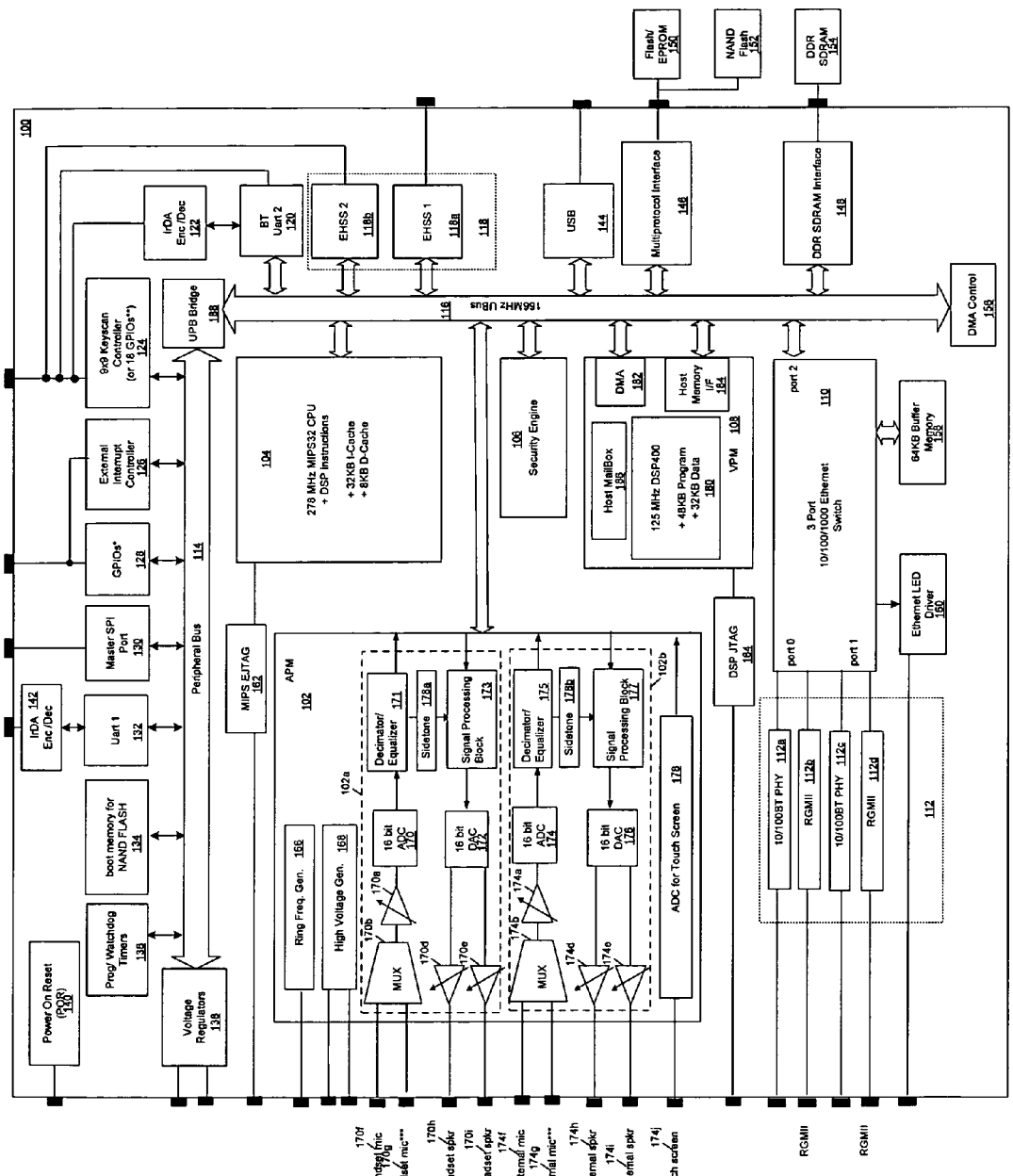
FIG. 1C is a block diagram of an exemplary system for a gigabit Ethernet IP telephone chip with an integrated DDR interface, in accordance with an embodiment of the invention.

FIG. 1C is a block diagram of an exemplary system for a gigabit Ethernet IP telephone chip with an integrated DDR interface, in accordance with an embodiment of the invention. Referring to FIG. 1C, the chip 100 may comprise a dual CODEC block 102, a core processor 104, security engine 106, voice processing module (VPM) 108, a multiport Ethernet switch 110, PHY/RGMII interfaces block 112, peripheral bus 114, system bus 116, power on reset (POR) block 140, voltage regulators block 138, DMA controller block 156, memory block 158, Ethernet LED interface 160, Joint Test Action Group (JTAG) ports 162, 164, a plurality of system interfaces, and a plurality of peripheral interfaces.

The system interfaces may comprise a Bluetooth interface 120, an Infrared Data Association (IrDA) encoder/decoder block 122, an enhanced high-speed serial (EHSS) port block 118, a universal serial bus (USB) interface block 144, multiprotocol interface block 146, and a DDR memory interface 148. Communication with the system, interfaces may occur via the system bus 116. The peripheral interfaces may comprise a keyscan controller block 124, an external interrupt controller block 126, a general purpose input/output (GPIO) block 128, a master serial peripheral interface (SPI)-port block 130, a universal asynchronous receiver/transmitter (UART) block 132, an Infrared Data Association (IrDA) encoder/decoder block 142, boot memory block for NAND flash 134, and programmable/watchdog-timers block 136. Communication with the peripheral interfaces may occur via the peripheral bus 114. The peripheral bus 114 and the system bus 116 may be coupled via a universal bus to peripheral bus bridge (UPB) 188.

The dual CODEC block 102, the core processor 104, the security engine 106, the voice processing module (VPM) 108, the multiport Ethernet switch 110, the DMA controller block 156, the Bluetooth interface 120, the enhanced high-speed serial (EHSS) port block 118, the universal serial bus (USB) interface block 144, the multiprotocol interface block 146, and the DDR memory interface 148 may be coupled via the system bus 116. The keyscan controller block 124, the external interrupt controller block 126, the general purpose input/output (GPIO) block 128, the master serial peripheral interface (SPI) port block 130, the universal asynchronous receiver/transmitter (UART) block 132, the Infrared Data Association (IrDA) encoder/decoder block 142, the boot memory block for NAND flash 134, and the programmable/watchdog timers block 136 may be coupled via the peripheral bus 114. Furthermore, the PHY/RGMII interfaces block 112, the memory block 158, and the Ethernet LED interface 160 may be coupled to the multiport Ethernet switch 110.

The dual CODEC block 102 comprises suitable coder/decoder (CODEC) logic, circuitry and/or code that may be adapted to handle compression/decompression of audio signals, such as conversion between analog signals and digital samples at various sample rates. For example, the dual CODEC block 102 may comprise a ring frequency generator block 166, a high voltage generator block 168, CODEC blocks 102a and 102b. The CODEC block 102a may comprise a decimator/equalizer block 171, a sidetone generator block 178a, a signal processing block 173, an interpolating CIC filter 173, an ADC block 170, a digital-to-analog converter (DAC) block 172, a multiplexer 170b, and gain controllers (amplifiers) 170a, 170d and 170e. Similarly, the CODEC block 102b may comprise a decimator/equalizer block 175, a sidetone generator block 178b, a signal processing block 177, an ADC block 174, a digital-to-analog converter (DAC) block 176, a multiplexer 174b, and gain controllers (amplifiers) 174a, 174d and 174e. The decimator/equalizer blocks 171 and 173 may comprise one or more decimating cascaded integrator comb (CIC) filters and/or one or more equalizers. The CIC filters may be adapted to perform resampling from 12.5 MHz, for example, which may be the raw sampling rate of the ADCs 170 and 174 and the DACs 172 and 176.

Also integrated within chip 100 is an ADC 178 that may be adapted to handle touch screen capability. Although the ADC 178 is illustrated as being internal to the dual CODEC block 102, the invention is not so limited. Accordingly, in another embodiment of the invention, the ADC 178 may be located externally to the dual CODEC block 102. The sidetone generator blocks 178a and 178b may comprise one or more Y-filters and may allow sidetone to be added to a receive path of an audio signal.

The CODEC block 102a may be adapted to support a plurality of input and a plurality of output audio sources by way of multiplexing. For example, audio input from a handset microphone 170f and a headset microphone 170g may be multiplexed by the multiplexer 170b and may be utilized as audio inputs to the CODEC block 102a. Audio output signals from the CODEC block 102a may be amplified by amplifiers 170d and 170e before being communicated to a handset speaker 170h and a headset speaker 170i, respectively.

Similarly, the CODEC block 102b may be adapted to support a plurality of input and a plurality of output audio sources by way of multiplexing. For example, audio input from an internal microphone 174f and an external microphone 174g may be multiplexed by the multiplexer 174b and may be utilized as audio inputs to the CODEC block 102b. Audio output signals from the CODEC block 102b may be amplified by amplifiers 174d and 174e before being communicated to an internal speaker 174h and an external speaker 174i, respectively. The ADC 178 may be adapted to convert analog signals received from the touch screen enabled monitor 174j.

The ring frequency generator 166 may comprise suitable circuitry, logic, and/or code and may be adapted to generate a ringing reference waveform. The generated ringing reference waveform may be utilized by one or more serial link and interrupt controllers (SLICs), integrated within the gigabit Ethernet IP telephone chip 100, to drive their high voltage ringing circuitry. The waveform generated by the ring frequency generator 166 may be configurable between sinusoids, trapezoids, and square waves. Frequency, amplitude, and DC offset may also be configurable. In one embodiment of the invention, the ring frequency generator 166 may comprise power down control circuitry.

The high voltage generator 168 may comprise suitable circuitry, logic, and/or code and may be adapted to generate voltages required by an external SLIC, for example, for ringing and battery feed. In one aspect of the invention, the high voltage generator 168 may be adapted to generate a plurality of negative supply voltages, such as −70 and −21 V nominally, which may be required for SLIC operation.

The core processor 104 may be, for example, a reduced instruction set computer (RISC) processor, such as a million-instructions-per-second (MIPS) processor. The core processor 104 may also comprise suitable logic, circuitry and/or code that may be adapted to handle digital signal processing (DSP) instructions. In an embodiment of the invention, the ability to handle DSP instructions by the core processor 104 may be enabled or disabled. Accordingly, the core processor 104 may be operated with the DSP instruction capability disabled. In one aspect of the invention, the ability to handle DSP instructions by the core processor 104 may be disabled when the voice processing module 108 is utilized. A Joint Test Action Group (JTAG) emulator (EJTAG) port 162 may be coupled to the processor core 162 and may be utilized for debugging. The core processor 104 may be a RISC processor that may be utilized to run operating system code and customer application code, for example. Customer application code may include messaging code, call processing code and web browser code, for example.

The security engine 106 may comprise suitable logic, circuitry, and/or code that may be adapted to handle security functions, such as encryption, decryption and/or authentication. The security engine 106 may comprise a hardware based security module (HSM), not shown in FIG. 1C, which may provide a hardware-ensured secure way to digitally identify a device based on cryptographic algorithms. Secure digital identification within the HSM may be achieved by, for example, embedding the identity or private key information in protected on-chip one-time programmable (OTP) ROM. Private key information may then be used to secure voice and/or data traffic within the gigabit Ethernet IP telephone chip 100. The HSM may also comprise assurance logic, which may be utilized to prevent device tampering and unwanted access to secure information in ROM. A gigabit Ethernet IP telephone chip with integrated security module is described in United States application Ser. No. 11/151,614 filed Jun. 13, 2005, which is incorporated herein by reference in its entirety.

The voice processing module (VPM) 108 may comprise digital signal processor (DSP) block 180, a host mailbox block 186, a direct memory access (DMA) block 182, and a host memory interface block 184. The DSP block 180 may comprise memory that may be adapted to handle storage of data and storage of program code. A JTAG port 164 coupled to the VPM 108 may be utilized for debugging. The DSP block 180 may be adapted to run voice processing application code and CODEC algorithms for one or more of a plurality of protocols or standards.

The VPM 108 may be adapted to perform voice related signal processing functions within the gigabit Ethernet IP telephone chip 100. The DMA block 182 may be utilized to transport CODEC data and/or program code between internal memory of the VPM 108 and external memory, such as dynamic random access memory (DRAM) for example, for processing. In one embodiment of the invention, the DMA block 182 may comprise a dual channel DMA engine. Voice data may be also stored in off-chip memory, such as DDR-SDRAM 154 via the DDR interface 148.

The host mailbox block 186 may comprise a set of mailbox registers, which may be utilized to provide communication between the core processor 104 and the DSP block 180. For example, the mailbox registers of the host mailbox block 186 may utilize an interrupt mechanism between the core processor 104 and the DSP block 180, for handling the processing of more data. The host memory interface 184 may be utilized by the DSP block 180 to directly access messages residing in external DRAM, for example.

The PHY/RGMII interfaces block 112 may comprise reduced gigabit media independent interfaces (RGMII) 112b and 112d, and 10/100 Base Ethernet physical interface transceivers (PHY) 112a and 112c. The RGMII 112b and 112d may comprise suitable circuitry, logic, and/or code and may be adapted to provide an interface between a gigabit media independent interface (GMII) of the multiport Ethernet switch 110 and an external Ethernet PHY. In one embodiment of the invention, the gigabit Ethernet IP telephone chip may utilize a gigabit PHY for receiving and transmitting of packetized data. The gigabit PHY may be implemented off-chip or may be integrated within the gigabit Ethernet IP telephone chip 100. In this regard, the RGMII 112b and 112d may provide an interface between a gigabit media independent interface (GMII) of the multiport Ethernet switch 110 and an external gigabit PHY.

The 10/100Base PHYs 112a and 112c may comprise suitable circuitry, logic, and/or code and may be adapted to perform physical layer interface functions for 100BASE-TX full-duplex or half-duplex Ethernet on Category 5 cable, and/or 10BASE-T full-duplex or half-duplex Ethernet on Category 3, 4, or 5 cabling within the gigabit Ethernet IP telephone chip 100. For example, the 10/100Base PHYs 112a and 112c may support 4B5B, MLT3, and Manchester encoding and decoding, clock and data recovery, stream cipher scrambling/descrambling. The 10/100Base PHYs 112a and 112c may also support digital adaptive equalization, line transmission, carrier sense and link integrity monitor, auto-negotiation, and management.

The multiport Ethernet switch 110 may comprise suitable circuitry, logic, and/or code and may be adapted to switch between one or more ports that route data internally within the gigabit Ethernet IP telephone chip 100 for processing and one or more other ports that route data for off-chip processing. For example, as illustrated in FIG. 1C, the multiport Ethernet switch 110, which may be a 10/100/1000 Ethernet switch, may comprise a plurality of ports, port 0 and port 1, for receiving and transmitting network and/or voice data off-chip via the PHY/RGMII interfaces block 112. The multiport Ethernet switch 110 may also comprise port 2 for routing voice and/or network data internally for processing within the gigabit Ethernet IP telephone chip 100. Port 0 may be coupled to the 10/100Base PHY 112a and RGMII interface 112b. Port 1 may be coupled to a 10/100Base PHY 112c and RGMII interface 112d. Port 2 may be coupled to the system bus 116.

The multiport Ethernet switch 110 may utilize memory 158 and an Ethernet LED interface 160. The Ethernet LED interface 160 may comprise suitable circuitry, logic, and/or code and may be utilized to provide visibility of link status, combined transmit and receive activity, duplex mode, and/or port speed for each port within the multiport Ethernet switch 110. The Ethernet LED interface 160 may also provide an indication of the load and/or status of the multiport Ethernet switch 110.

The keyscan controller block 124 may comprise suitable logic, circuitry and/or code that may be adapted to determine when a key is pressed and to identify what key or keys are depressed. In one aspect of the invention, the input and output pins of the keyscan controller block 124 may be configured as general purpose input/output (GPIO) pins. The power on reset (POR) block 140 may comprise suitable logic and/or circuitry that may be adapted to handle power up and reset scenarios. The voltage regulators block 138 may comprise suitable logic and/or circuitry that may be adapted to handle voltage/current regulation within the gigabit Ethernet IP telephone chip 100.

The multiprotocol peripheral interface (MPI) block 146 may comprise suitable logic, circuitry and/or code that may be adapted to handle a plurality of different types of memory. As illustrated in FIG. 1C, flash/EPROM block 150 and NAND flash block 152 may be coupled to the multiprotocol interface block 146. The MPI block 146 may also support other types of memory, such as NOR flash memory, as well as PCI, Mini PCI, CardBus, PCMCIA and expansion bus interface (EBI) devices. In this regard, the gigabit Ethernet IP telephone chip 100 may be adapted support high-speed peripherals, including wireless network adaptors and/or video processors, for example.

The memory interface 148 may be, for example, a double data rate (DDR) SDRAM interface block. As illustrated in FIG. 1C, a DDR SDRAM block 154 may be externally coupled to the DDR SDRAM interface block 148. The memory interface 148 may be utilized to speedily move data on-chip and off-chip for processing. The DMA controller block 156 may be utilized to facilitate DMA transfers between the external SDRAM 154 and EBI devices coupled to the gigabit Ethernet IP telephone chip 100.

The universal serial bus (USB) interface block 144 may comprise a USB compliant serial bus, which may be, for example, USB1.1, USB2.0, or other USB compliant interface.

The external interrupt controller block 126 may comprise suitable logic, circuitry, and/or code and may be adapted to handle external interrupts. For example, one or more external events may cause the external interrupt controller 126 to generate an interrupt to the core processor 104.

The GPIO block 128 may comprise a plurality of general-purpose I/O interface pins that may be programmed as input and/or output pins of the gigabit Ethernet IP telephone chip 100. One or more registers within the gigabit Ethernet IP telephone chip 100 may be utilized to program the general-purpose I/O interface pins in the GPIO block 128. The GPIO block 128 may also comprise a LED matrix block, which may be utilized to indicate a status of the GPIO interface pins.

The master SPI port block 130 is a standardized serial peripheral interface (SPI) port and may be utilized for communication with the serial programming interfaces of various devices coupled to the gigabit Ethernet IP telephone chip 100.

The universal asynchronous receiver/transmitter (UART) block 132 may comprise a standard UART port which may be utilized as a debug port. The UART block 132 may be coupled to an Infrared Data Association (IrDA) encoder/decoder block 142 which may support serial infrared (SIR) mode of infrared communication. In this regard, the IrDA encoder/decoder block 142 may support an infrared communication portal between a PC and PDAs or cellular phones utilizing the gigabit Ethernet IP telephone chip 100.

The boot memory block for NAND flash 134 may be adapted to store boot code that controls initialization and setup of the gigabit Ethernet IP telephone chip 100. Other code or parameters may also be stored in the boot memory block for NAND flash 134.

The programmable/watchdog timers block 136 may comprise a plurality of timers such as a watchdog timer. In this regard, a watchdog timer may be included to generate a chip reset if the gigabit Ethernet IP telephone chip 100 is not periodically reset. An interrupt, for example, may be generated after one-half the watchdog count to remind the host to reset the timer.

The Bluetooth interface 120 is Bluetooth compliant and may be coupled to the IrDA encoder/decoder (ENC/DEC) interface block 122. The Bluetooth interface 120 may comprise an UART which may be adapted to support external Bluetooth modules. The Infrared Data Association (IrDA) encoder/decoder block 122 may support serial infrared (SIR) mode of infrared communication.

The enhanced high speed serial (EHSS) port block 118 comprises at least one EHSS interface that is configured to handle serial data. As illustrated in FIG. 1C, the EHSS block 118 may comprise a first EHSS 118a and a second EHSS interface 118b. The EHSS 118a and 118b may provide time division multiplexing (TDM) interface for connecting the gigabit Ethernet IP telephone chip 100 with external CODECs or any external device with a synchronous interface.

The UPB bridge block 188 may comprise suitable circuitry, logic, and/or code and may be adapted to bridge the peripheral bus 114 and the system bus 116. Accordingly, the UPB bridge facilitates communication between devices coupled to the system bus 116 and peripheral devices coupled to the peripheral bus 114.

During an exemplary voice data transmission operating cycle, voice data may be acquired via the microphone ports 170f, 170g, 174f, and 174g of CODEC blocks 102a and 102b within the dual CODEC block 102. Voice data may be initially amplified by the on-board amplifiers 170a and 174a, and then digitized by the ADC blocks 170 and 174 at a high sampling rate, such as 12.5 MHz, for example. The oversampled voice data may be decimated by the CIC (Cascaded-Integrated-Comb) filters within the decimator/equalizer blocks 171 and 175, which may resample the data to an intermediate sampling rate of 100 kHz, for example.

A gain or attenuation may be applied to the resulting 100 kHz sampled signal. The gain-adjusted 100 kHz samples may be further downsampled by an asynchronous sample rate converter (ASRC), not shown in FIG. 1C, to a rate (voiceband) suitable for software digital signal processing, such as 16 kHz. The voiceband samples may be filtered by a programmable equalizer within the decimator/equalizer blocks 171 and 175, which may equalize the transducer response in order to meet telecom specifications. The voice data output of the decimator/equalizer blocks 171 and 175 may be stored in the external SDRAM 154 via the system bus 116 and a DMA control block within the dual CODEC block 102.

The stored voice data may then be communicated to the VPM block 108 for processing. For example, the equalized voice data may be processed by the DSP 180 using voice processing software stack. The software stack within the DSP 180 may perform VoIP processing, such as acoustic echo cancellation, handset echo cancellation, conference bridging, tone generation, comfort noise generation, and/or voice compression. In one embodiment of the invention, the gigabit Ethernet IP telephone chip 100 may utilize the core processor 104 to perform DSP processing functions. In this regard, equalized voice data may be communicated to the core processor 104 for DSP processing.

After equalized voice data is processed by the VPM 108, compressed speech frames may be packetized by the core processor 104. If security is required, packetized voice data may be communicated to the security module 106 for encryption. During encryption, voice data may be communicated from the VPM 108 to the security module 106 via the external SDRAM 154. After encryption, encrypted data packets may be further encapsulated by the core processor 104 with headers suitable for transmission over an IP network.

Encrypted packetized voice data may then be communicated to the multiport Ethernet switch 110 via direct memory access using the external SDRAM 154 and the DMA control block within the Ethernet switch 110. The multiport Ethernet switch 110 may then route the packetized voice data to a network port, such as port 1, for example. The packetized voice data may be converted into signals suitable for transmission over an Ethernet cable medium using the internal 10/100Base Ethernet PHY 112c or a gigabit Ethernet PHY, not illustrated in FIG. 1C, coupled to the RGMII interface 112d. A gigabit Ethernet PHY may be located, for example, off-chip. The 10/100Base PHY or the gigabit PHY may then transmit the packetized voice data via an Ethernet network.

During an exemplary voice data reception operating cycle, packetized voice data may be received by the multiport Ethernet switch 110 via an Ethernet cable medium using the internal 10/100Base Ethernet PHY 112c or a gigabit Ethernet PHY coupled to the RGMII interface 112d of port 1 of the multiport Ethernet switch 110. The multiport Ethernet switch 110 may then route the packetized voice data internally for processing within the gigabit Ethernet IP telephone chip 100 via port 2. For example, the packetized voice data may be stored in the external DDR SDRAM 154 via the system bus 116 and the DMA control block within the Ethernet switch 110.

The stored packetized voice data may then be communicated to the security module 106 for decryption. Decrypted packetized data may be depacketized by the core processor 104. Depacketized and decrypted voice data may be communicated to the VPM 108 for processing. The VPM 108 may decompress the voice data and may communicate the decompressed voice data to the dual CODEC block 102. The decompressed data may be filtered by the CIC filter 173 or 177 within the CODEC blocks 102a or 102b. Filtered voice data may be converted to an analog signal by the DAC converters 172 or 176, amplified by the amplifiers 170d, 170e, 174d, and 174e, and communicated to one or more of the audio signal outputs 170h, 170i, 174h, and 174i.

During an exemplary network data transmission operating cycle, network data, such as Ethernet data from a PC, may be received by the multiport Ethernet switch 110 via an Ethernet cable medium using the internal 10/100Base Ethernet PHY 112a or a gigabit Ethernet PHY coupled to the RGMII interface 112b of port 0 of the multiport Ethernet switch 110. In one embodiment of the invention, one of the ports of the multiport Ethernet switch 110, such as port 0, may be designated as a PC port and may be utilized during reception and transmission of PC Ethernet data. The 10/100Base Ethernet PHY 112a or the gigabit PHY may convert the PC Ethernet data from analog to digital format. The multiport Ethernet switch 110 may then route the resulting IP packets to a second port, such as port 1, for communicating the packetized PC Ethernet data off-chip. For example, the multiport Ethernet switch 110 may then route the resulting IP packets to the internal 10/100Base PHY 112c of port 1 or to an external gigabit PHY via the RGMII interface 112d. The 10/100Base PHY 112c or the gigabit PHY may convert the packetized PC Ethernet data into signals suitable for transmission over Ethernet cable medium. In this regard, the signal may flow through the Ethernet cable medium and into an IP network.

During an exemplary network data reception operating cycle, network data, such as Ethernet data for a PC, may be received by the multiport Ethernet switch 110 via an Ethernet cable medium using the internal 10/100Base Ethernet PHY 112c or a gigabit Ethernet PHY coupled to the RGMII interface 112d of port 1 of the multiport Ethernet switch 110. In one embodiment of the invention, one of the ports of the multiport Ethernet switch 110, such as port 0, may be designated as a PC port and may be utilized during reception and transmission of PC Ethernet data. A second port, such as port 1, may be designated as a network port and may be utilized during reception and transmission of packetized data, including voice and network data, from and to an IP network. The 10/100Base Ethernet PHY 112d or the gigabit PHY may convert the network data from analog to digital format. The multiport Ethernet switch 110 may then route the resulting IP packets to a second PC data port, such as port 0, for communicating the packetized network data off-chip to a PC. For example, the multiport Ethernet switch 110 may route the resulting IP packets to the internal 10/100Base PHY 112a of port 0 or to an external gigabit PHY via the RGMII interface 112b. The 10/100Base PHY 112a or the gigabit PHY may convert the packetized PC Ethernet data into signals suitable for transmission over Ethernet cable medium. In this regard, the signal may flow through the Ethernet cable medium and off-chip to a PC for processing.

Figure 2:
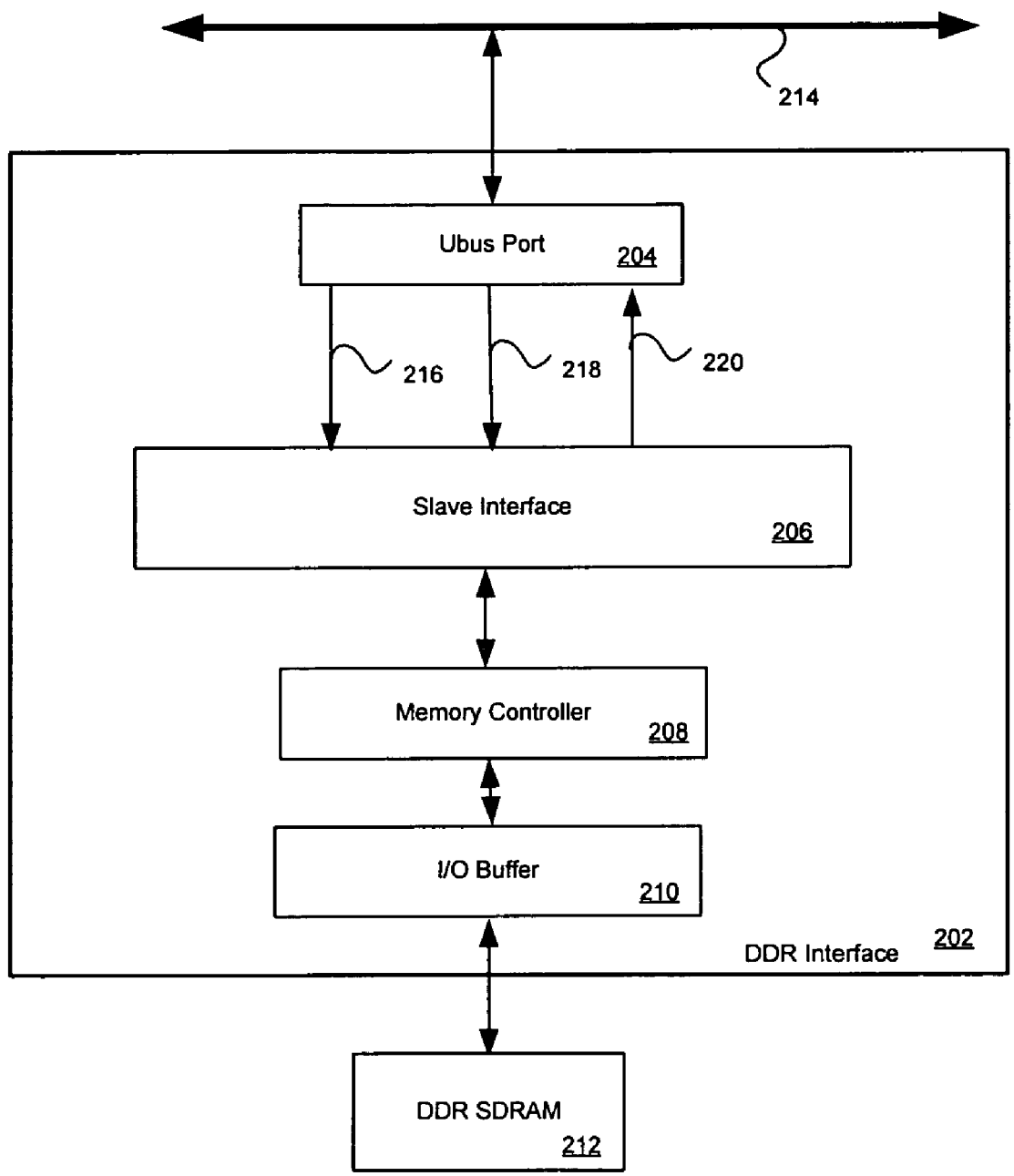
FIG. 2 is a block diagram of an exemplary DDR interface, in accordance with an embodiment of the invention.

FIG. 2 is a block diagram of an exemplary DDR interface, in accordance with an embodiment of the invention. Referring to FIG. 2, the DDR interface 202 may comprise a universal bus port 204, a slave interface 206, a memory controller 208, and an input/output (I/O) buffer 210.

The universal bus port 204 may comprise suitable circuitry, logic, and/or code and may be adapted to handle protocol for interfacing the DDR interface 202 with a universal system bus 214 within a gigabit Ethernet IP telephone chip, for example, such as the gigabit Ethernet IP telephone chip 100 of FIG. 1C. The universal bus port 204 may utilize a high priority request queue 216 and a low priority request queue 218 to handle requests for accesses to the external DDR memory 212. The slave interface 206 may comprise suitable circuitry, logic, and/or code and may be adapted to decode access requests from the universal bus port 204. A universal bus port transaction type and address obtained from the universal bus port 204 may be utilized to determine the type of access to be performed. Memory Read, Memory Write, Memory Write with Reply, and Memory Swap commands, for example, may be decoded as SDRAM access requests received from the system bus 214.

The memory controller 208 may comprise suitable circuitry, logic, and/or code and may be adapted to provide an interface to the external memory 212. In one embodiment of the invention, the DDR interface 202 may support a DDR SDRAM external memory 212. In this regard, the external double data rate SDRAM memory 212 may be supported on a 16-bit interface, for example, provided by the memory controller 208. Furthermore, one chip select may be provided, which allows a selectable memory depth. For example, a chip select may be provided which allows a selectable memory depth of 256 MB.

In operation, incoming requests from a core processor, such as the core processor 104 in FIG. 1C, may be communicated via the system bus 214 to the universal bus port 204 and may be placed in the high priority request queue 216. Incoming memory requests may be related to processing of data within a gigabit Ethernet IP telephone chip, such as encoding or decoding of voice data, for example. Other incoming requests may be placed in the low priority request queue 218. In one embodiment of the invention, the universal bus port 204 may be adapted to service one request at a time and a single-reply out queue 220 may be utilized for reply packets, such as packet service confirmations, communicated from the slave interface 206 to the universal bus port 204. The contents of both high and low priority queues 216 and 218 may be communicated to the slave interface 206 for processing.

The slave interface 206 may be adapted to arbitrate between the two queues 216 and 218 using a programmable, weighted priority scheme, for example. In one embodiment of the invention, the universal bus port 204 may be adapted to disable the high priority queue 216 for more energy efficient operation of the DDR interface 202, for example during low power mode of operation. If the high priority queue 216 is disabled, all incoming requests may be placed in the low priority queue 218. In this regard, the I/O Read, I/O Write and I/O Write with Reply commands may be decoded as control register accesses and/or as free pool access commands. For efficient access to the external DDR memory 212, the address of the memory access requests may be verified by the slave interface 206 to determine if it is in the range of the DDR memory 212 attached to the DDR interface 202.

The memory controller 208 may be adapted to look ahead at pending transactions, such as memory access requests to determine whether to precharge an already opened memory bank, activate a new memory bank, or proceeds to execute the memory access command. The memory controller 208 may be adapted to keep a plurality of memory banks open as long as there is a pending memory access request and there is no page miss. This allows for a new transaction to begin without a significant delay. In one embodiment of the invention, the memory controller 208 may be adapted to support a plurality of power saving modes, such as self refresh mode and power down mode, for example. These power saving modes may be entered by programming a control register within the slave interface 206. The self-refresh mode may be characterized as a low-power mode that retains values in memory, and the power-down mode may be characterized as a low-power mode that does not retain values in memory.

Figure 3:
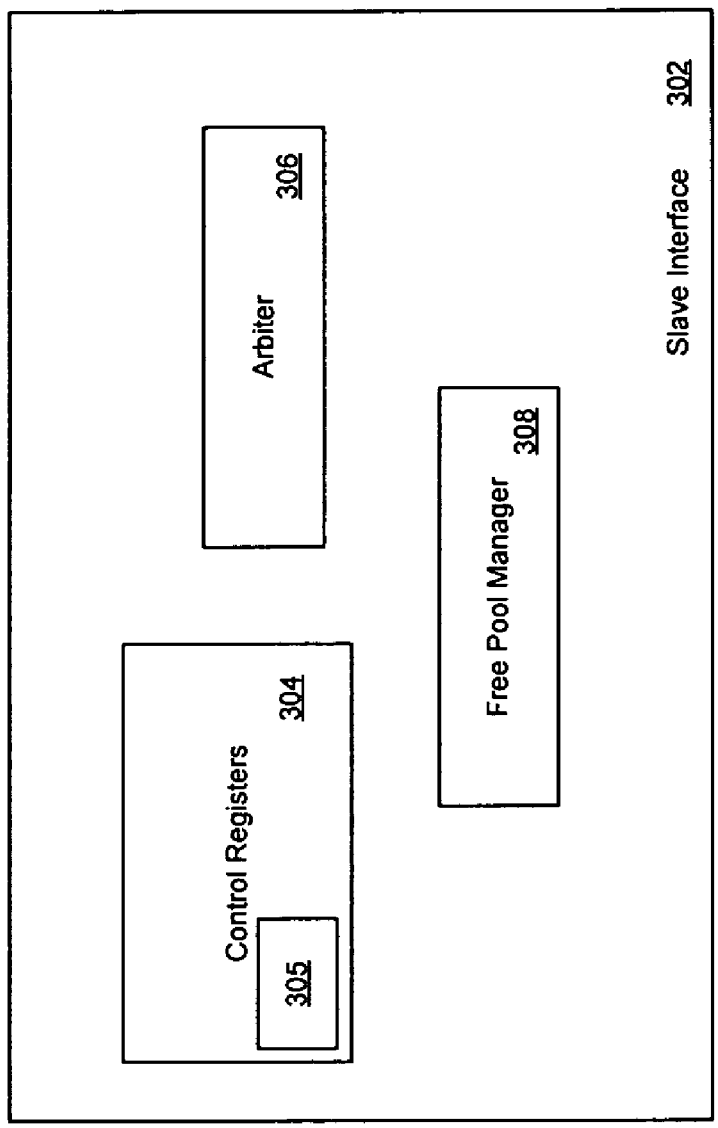
FIG. 3 is a block diagram of a slave interface which may be utilized within the exemplary DDR interface of FIG. 2, for example, in accordance with an embodiment of the invention.

FIG. 3 is a block diagram of a slave interface which may be utilized within the exemplary DDR interface of FIG. 2, for example, in accordance with an embodiment of the invention. Referring to FIG. 3, the slave interface 302 may comprise a control register block 304, an arbiter 306, and a free pool manager 308.

Referring to FIGS. 2 and 3, the arbiter 306 may comprise suitable circuitry, logic, and/or code and may be adapted to control access to the external memory, such as the external DDR memory 212. For example, the arbiter 306 may be adapted to select among access requests from the high priority queue 216, the low priority queue 218, and/or the free pool manager 308. A weighted priority scheme may be used to arbitrate between the high priority queue 216, the low priority queue 218 and the free pool manager 308.

The control registers block 304 may comprise registers which may be programmed by a core processor, for example, to control operation of the memory controller 208 and the free pool manager. The control registers block 304 may be selected when the slave interface 206 decodes an I/O Read or Write command which is not designated for the free pool manager 308. The control registers block may be adapted to perform the Read or Write command operation and to provide an acknowledgement back to the slave interface 206. The control registers block 304 may be also adapted to manage refresh requests. In this regard, a refresh timer within the DDR interface 202 may be programmed to the desired refresh interval. When the timer expires, a refresh request may be issued to the slave interface 206. The timer may then begin to count the refresh interval again and the refresh request control may remain asserted until it has been serviced.

In operation, the arbiter 306 may utilize a queue priority register 305 within the control register block 304 to define the weighting. For example, the value in the queue priority register 305 may represent the number of accesses to be performed from the high priority queue 216, if available, before the next access is performed from either the low priority queue 218 or the free pool manager 308. If the queue priority register 305 is programmed to its maximum value, for example 0xF, the weighted priority may be disabled and the high priority queue 216 may be given absolute priority over the low priority queue 218. To complete the free pool initialization promptly, a request from the free pool manager 308 may be given priority over a request from the low priority queue 218. The arbiter 306 may read ahead the next access while the current operation is in progress. If the next access is to external memory 212, the arbiter 306 may present a pending request to the memory controller 208. The memory controller 208 may then use the presented pending request to determine whether a pre-charge cycle may be required before the next memory access.

The free pool manager 308 may comprise suitable circuitry, logic, and/or code and may be adapted to provide hardware support for managing a pool of buffers in the external memory 212. In one embodiment of the invention, the free pool manager 308 may be used to initiate a state machine that sets up the external memory 212 as a linked list of buffers within the free pool manager 308. For example, the first word of each buffer may be written with a pointer to the next buffer in the list. The slave interface 206 may maintain a count of the number of available buffers in the free pool manager 308. The slave interface 206 may also utilize a programmable buffer threshold. When a buffer is allocated within the free pool manager 308 that makes the available buffer count fall below the buffer threshold, an interrupt may be generated. In another embodiment of the invention, the free pool manager 308 may be used to manage buffers with multiple references. In this regard, buffers within the free pool manager 308 may be freed when corresponding references have been individually deallocated.

Figure 4:
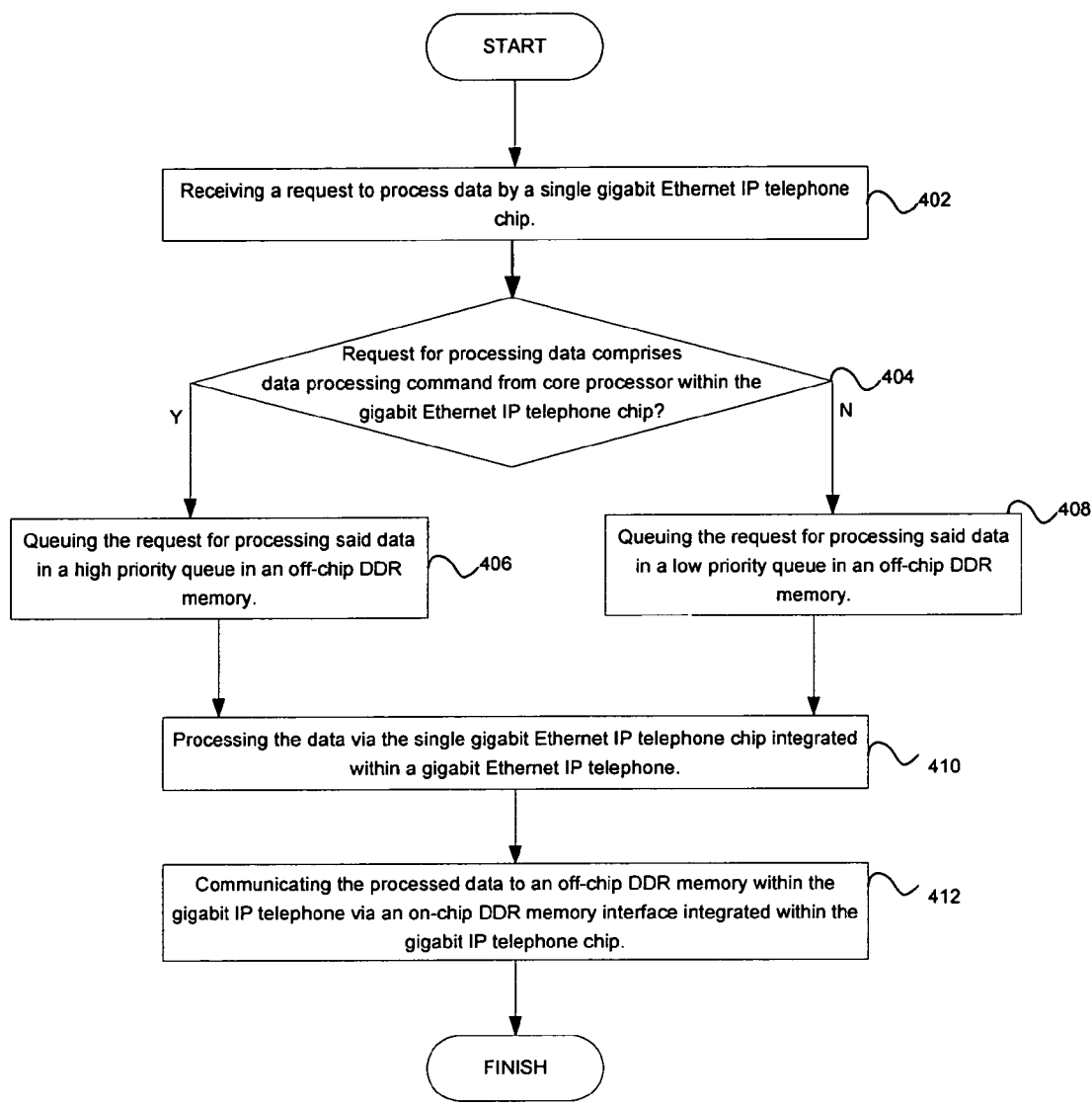
FIG. 4 is a flow diagram illustrating exemplary steps for processing Ethernet data, in accordance with an embodiment of the invention.

FIG. 4 is a flow diagram illustrating exemplary steps for processing Ethernet data, in accordance with an embodiment of the invention. Referring to FIGS. 1C and 4, at 402, a request to process data may be received by a single gigabit Ethernet IP telephone chip 100 with integrated DDR interface 148. At 404, it may be determined whether the received request for processing the data comprises a data processing command from a core processor 104 within the single gigabit Ethernet IP telephone chip 100. If the received request for processing the data comprises a data processing command from a core processor 104 within the single gigabit Ethernet IP telephone chip 100, at 406, the request may be queued for processing said data in a high priority queue in an off-chip DDR memory 154. If the received request for processing the data does not comprises a data processing command from the core processor within the single gigabit Ethernet IP telephone chip, at 408, the request for processing the data may be queued in a low priority queue in the off-chip DDR memory 154. At 410, the data may be processed via the single gigabit Ethernet IP telephone chip 100 integrated within a gigabit Ethernet IP telephone. At 412, the processed data may be communicated to an off-chip DDR memory within the gigabit IP telephone via an on-chip DDR memory interface 148 integrated within the gigabit IP telephone chip 100.

Referring to FIG. 1C, in one embodiment of the invention, a system for processing data may comprise a processor 104 that processes data via a single gigabit Ethernet IP telephone chip 100 integrated within a gigabit Ethernet IP telephone. The processor 104 may communicate at least a portion of the processed data to an off-chip DDR memory 154 within the gigabit IP telephone via an on-chip DDR memory interface 148 integrated within the gigabit IP telephone chip 100. The processor 104 may acquire the data from the off-chip DDR memory 154 via the DDR memory interface 148 for the processing. In addition, the processor 104 may receive a request to process the data by the gigabit Ethernet IP telephone chip 100. The request for processing the data may comprise a Memory Read command, a Memory Write command, a Memory Write with Reply command, a Memory Swap command, an Input/Output (I/O) Read command, an I/O Write command, and/or an I/O Write with Reply command.

If the received request for processing the data comprises a data processing command, the processor 104 may queue the request for processing the data in a high priority queue 154a in the off-chip DDR memory 154. If the received request for processing the data comprises a command other than the data processing command, the processor 104 may queue the request for processing the data in a low priority queue 154b in the off-chip DDR memory 154. The processor 104 may generate based on the received request for processing the data, a DDR memory access for accessing the off-chip DDR memory 154 during the processing of the data. The processor 104 may also arbitrate access to the off-chip DDR memory 154 via the on-chip DDR memory interface 148. Furthermore, the processor 104 arbitrates access to the off-chip DDR memory 154 via the on-chip DDR memory interface 148 utilizing a weighted priority arbitration scheme. The processor 104 may link memory buffers within the off-chip DDR memory 154 for storing the processed data.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing data, the method comprising:
receiving a signal that requests access to a Double Data Rate Random Access Memory (DDR RAM) interface integrated within a single gigabit Ethernet IP telephone chip in a gigabit Ethernet IP telephone, wherein said signal is prioritized into one of a plurality of queues within said DDR RAM interface; and
looking ahead, by said DDR RAM interface based on said received prioritized signal, at least one pending transaction associated with said requested access, prior to communicating data associated with said at least one pending transaction between said gigabit Ethernet IP telephone chip and an off-chip DDR RAM communicatively coupled via said DDR RAM interface to said single gigabit Ethernet IP telephone chip.

2. The method according to claim 1, comprising decoding said signal that requests access to said DDR RAM interface.

3. The method according to claim 2, comprising determining an access type associated with said signal that requests access to said DDR RAM interface.

4. The method according to claim 3, comprising determining based on said access type, whether said signal that requests access to said DDR RAM interface is one of the following: an access to said off-chip DDR RAM and an access to a pool of buffers in said off-chip DDR RAM.

5. The method according to claim 1, wherein said received signal that requests access to said DDR RAM interface comprises one or more of a Memory Read memory access command, a Memory Write memory access command, a Memory Write with Reply memory access command, and/or a Memory Swap memory access command.

6. The method according to claim 1, wherein said received signal that requests access to said DDR RAM interface comprises one or more of an Input/Output (I/O) Read buffer pool command, an I/O Write buffer pool command, and/or an I/O Write with Reply buffer pool command.

7. The method according to claim 1, comprising arbitrating access to said off-chip DDR RAM via said DDR RAM interface.

8. The method according to claim 1, comprising arbitrating access to said off-chip DDR RAM via said DDR RAM interface utilizing a weighted priority arbitration scheme.

9. The method according to claim 1, comprising prioritizing access to said DDR RAM interface based on a source of said signal that requests access to said DDR RAM interface.

10. The method according to claim 1, comprising queuing said signal that requests access to said DDR RAM interface in a high priority queue in said off-chip DDR RAM when said signal that requests access to said DDR RAM interface originates from a core processor within said single gigabit Ethernet IP telephone chip.

11. The method according to claim 10, comprising queuing said signal that requests access to said DDR RAM interface in a low priority queue in said off-chip DDR RAM when said signal that requests access to said DDR RAM interface originates from a source other than said core processor.

12. A system for processing data, the system comprising:
at least one processor that enables receiving a signal that requests access to a DDR RAM interface integrated within a single gigabit Ethernet IP telephone chip in a gigabit Ethernet IP telephone, wherein said signal is prioritized into one of a plurality of queues within said DDR RAM interface; and
said at least one processor enables looking ahead, by said DDR RAM interface based on said received prioritized signal, at least one pending transaction associated with said requested access, prior to communication of data associated with said at least one pending transaction between said gigabit Ethernet IP telephone chip and an off-chip DDR RAM communicatively coupled via said DDR RAM interface to said single gigabit Ethernet IP telephone chip.

13. The system according to claim 12, wherein said at least one processor enables decoding of said signal that requests access to said DDR RAM interface.

14. The system according to claim 13, wherein said at least one processor enables determination of an access type associated with said signal that requests access to said DDR RAM interface.

15. The system according to claim 14, wherein said at least one processor enables determination based on said access type, whether said signal that requests access to said DDR RAM interface is one of the following: an access to said off-chip DDR RAM and an access to a pool of buffers in said off-chip DDR RAM.

16. The system according to claim 12, wherein said received signal that requests access to said DDR RAM interface comprises one or more of a Memory Read memory access command, a Memory Write memory access command, a Memory Write with Reply memory access command, and/or a Memory Swap memory access command.

17. The system according to claim 12, wherein said received signal that requests access to said DDR RAM interface comprises one or more of an Input/Output (I/O) Read buffer pool command, an I/O Write buffer pool command, and/or an I/O Write with Reply buffer pool command.

18. The system according to claim 12, wherein said at least one processor enables arbitration of access to said off-chip DDR RAM via said DDR RAM interface.

19. The system according to claim 12 wherein said at least one processor enables arbitration of access to said off-chip DDR RAM via said DDR RAM interface utilizing a weighted priority arbitration scheme.

20. The system according to claim 12, wherein said at least one processor enables prioritization of access to said DDR RAM interface based on a source of said signal that requests access to said DDR RAM interface.

21. The system according to claim 12, wherein said at least one processor enables queuing of said signal that requests access to said DDR RAM interface in a high priority queue in said off-chip DDR RAM, if said signal that requests access to said DDR RAM interface originates from a core processor within said single gigabit Ethernet IP telephone chip.

22. The system according to claim 21, wherein said at least one processor enables queuing of said signal that requests access to said DDR RAM interface in a low priority queue in said off-chip DDR RAM, if said signal that requests access to said DDR RAM interface originates from a source other than said core processor.

23. The method according to claim 1, wherein said looking ahead of said at least one pending transaction comprising determining whether to precharge an already opened memory bank, activate a new memory bank, or proceed to execute a memory access command.

24. The system according to claim 12, wherein said looking ahead of said at least one pending transaction comprising determining whether to precharge an already opened memory bank, activate a new memory bank, or proceed to execute a memory access command.

* * * * *